(No Model.)
E. OSGOOD.
Saw.
No. 238,521. Patented March 8, 1881.
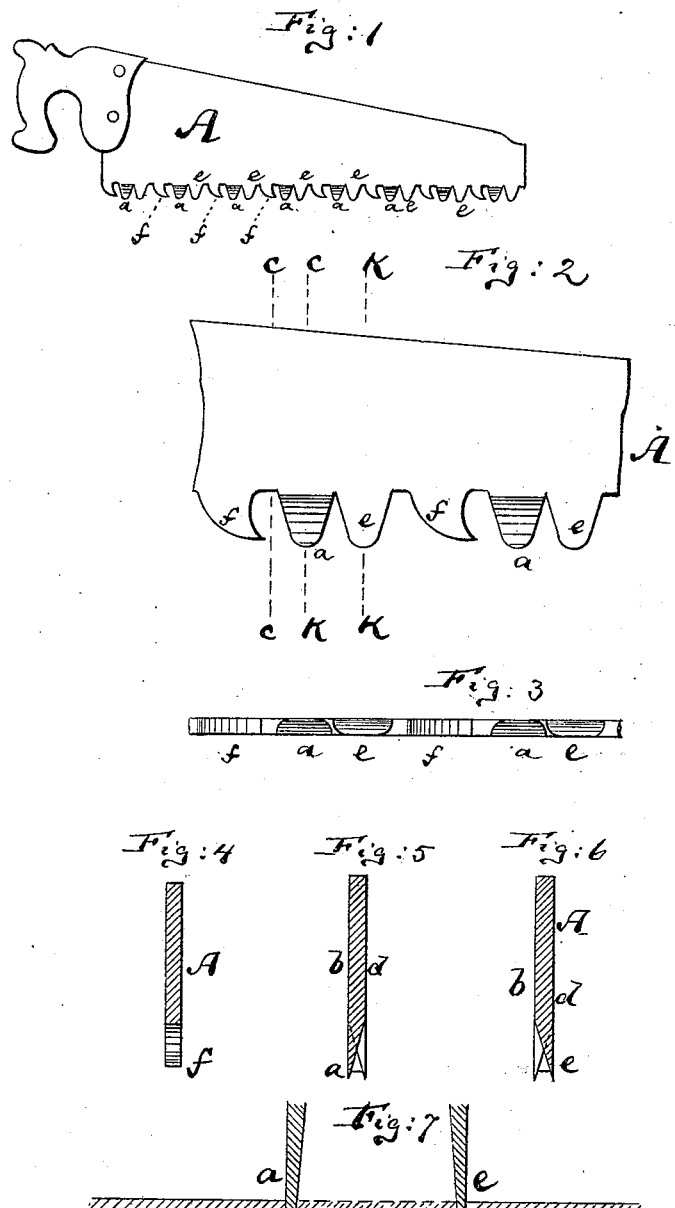
Witnesses:
John C. Tunbridge
John M. Speer.
Inventor:
Enoch Osgood
by his attorney
A. v. Briesen

UNITED STATES PATENT OFFICE.

ENOCH OSGOOD, OF BROOKLYN, NEW YORK.

SAW.

SPECIFICATION forming part of Letters Patent No. 238,521, dated March 8, 1881.

Application filed June 10, 1880. (No model.)

*To all whom it may concern:*

Be it known that I, ENOCH OSGOOD, of Brooklyn, in the county of Kings and State of New York, have invented a new and Improved Saw, of which the following is a specification.

Figure 1 is a side view of a handsaw containing my invention. Fig. 2 is an enlarged side view of a portion thereof, showing the teeth more clearly. Fig. 3 is a bottom or edge view thereof. Figs. 4, 5, and 6 are cross-sections thereof on the lines $c\ c\ c\ k$ and $k\ k$, Fig. 2, respectively. Fig. 7 is a diagram, on an enlarged scale, showing the effect of the saw on a block of wood or other material.

This invention relates to a new manner of arranging the teeth of a saw.

The invention is shown applied to a handsaw, but is equally applicable to any other kind of saw—circular, reciprocating, band, or otherwise.

The invention consists in providing the saw with side cutting-teeth and with intermediate chisel-teeth. The side teeth cut down and define the channel to be cut by the chisel-teeth, that are somewhat shorter than the others, and cut and lift out the thin rib which is formed by the action of the side cutters. This saw need not be set, and will make a very clean cut, nearly or quite equaling the action of a plane in its surface effect. It will, when started, immediately take hold of the block and cut its path straight and clean, and will not be liable to jump. It can be used on every kind of wood—dry, wet, or knotted, and in any direction.

In the drawings, A represents the saw-blade. $a\ a$ are series of side cutting-teeth, all projecting from the blade A so that one face of each is in line with the face $b$ of the blade, and the other face beveled until it reaches the face $d$ of the blade. (See Fig. 5.) $e\ e$ are other series of side cutting-teeth, all projecting from the blade so that one face of each is in line with the face $d$ of the blade, and the other face beveled until it reaches the face $b$ of the blade. (See Fig. 6.) The teeth $a$ and $e$ have sharpened, preferably rounded, cutting-edges, and are all of equal length. Alternating with a pair of teeth, $a$ and $e$, are on the blade a series of chisel-teeth, $f\,f$, which are a little shorter than the cutting-teeth $a\ e$, and as wide, or nearly as wide, as the blade A, as in Fig. 4. The teeth $f$ are hook-shaped, as in Fig. 2, and all extend in the same direction. Their lower edges are either flat or bifurcated.

The operation is as follows: The tapering teeth $a$ and $e$, upon entering the block to be sawed, cut very narrow side channels down into the block, and then the chisel-teeth $f$ cut and lift out the piece $h$ left between said channels. (See Fig. 7.) Not being quite as long as the side cutting-teeth, $a\ e$, the teeth $f$ always find what they cut out already detached at the sides. In other words, the teeth $a\ e$ prepare a core which the chisel-teeth easily cut out of the block, the same as a chisel will cut what is left between two vertical cuts.

In case but one set of side cutting-teeth is used the saw will be useful for cutting down the edges of panels, or for cutting mortises, grooves, tenoning spokes, and other like purposes.

The teeth $a\ e$ cut both ways on reciprocating the saw, but the teeth $f$ only cut one way, thus giving the teeth $a\ e$ ample opportunity to cut channels for the chisel-teeth, as stated.

I claim—

1. A saw having side cutting-teeth, $a\ a$, and chisel-cutting teeth $f\,f$, the teeth $f$ being curved, as shown, to undercut or plane out the wood between the scores made by the teeth $a$, substantially as specified.

2. A saw having double-acting side cutting-teeth, $a$ and $e$, and single-acting chisel-teeth $f$, curved as shown, and shorter than the teeth $a\ e$, substantially as herein shown and described.

ENOCH OSGOOD.

Witnesses:
 WILLY G. E. SCHULTZ,
 WILLIAM H. C. SMITH.